(12) United States Patent  
Stevenson

(10) Patent No.: US 7,008,346 B2  
(45) Date of Patent: Mar. 7, 2006

(54) SEVEN-SPEED TRANSMISSION

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 85 days.

(21) Appl. No.: 10/801,784

(22) Filed: Mar. 16, 2004

(65) Prior Publication Data

US 2005/0049105 A1 Mar. 3, 2005

Related U.S. Application Data

(60) Provisional application No. 60/497,640, filed on Aug. 25, 2003.

(51) Int. Cl.
 F16H 13/06 (2006.01)
 F16H 3/62 (2006.01)
 F16H 3/44 (2006.01)

(52) U.S. Cl. .................. 475/275; 475/114; 475/284
(58) Field of Classification Search ............. 475/114, 475/116, 275, 278, 284, 285, 331
See application file for complete search history.

(56) References Cited

U.S. PATENT DOCUMENTS

| | | | | |
|---|---|---|---|---|
| 3,095,755 A | * | 7/1963 | Duffy ..................... 477/135 |
| 3,265,175 A | * | 8/1966 | Croswhite ............. 192/87.13 |
| 3,287,995 A | * | 11/1966 | Leonard et al. ............ 477/53 |
| 4,070,927 A | | 1/1978 | Polak ......................... 74/765 |
| 4,709,594 A | | 12/1987 | Maeda ....................... 74/753 |
| 5,049,116 A | * | 9/1991 | Asada ...................... 475/269 |
| 5,098,357 A | * | 3/1992 | Asada et al. ............. 475/278 |
| 5,106,352 A | | 4/1992 | Lepelletier ............... 475/280 |
| 5,599,251 A | | 2/1997 | Beim et al. ............... 475/275 |
| 6,053,839 A | | 4/2000 | Baldwin et al. .......... 475/281 |
| 6,071,208 A | | 6/2000 | Koivunen ................. 475/275 |
| 6,083,135 A | | 7/2000 | Baldwin et al. .......... 475/276 |
| 6,139,463 A | * | 10/2000 | Kasuya et al. ........... 475/275 |
| 6,425,841 B1 | * | 7/2002 | Haka ........................ 475/275 |
| 6,530,858 B1 | * | 3/2003 | Usoro et al. .............. 475/296 |
| 6,558,287 B1 | | 5/2003 | Hayabuchi et al. ...... 475/271 |
| 6,910,985 B1 | * | 6/2005 | Ishimaru et al. .......... 475/275 |
| 2002/0091032 A1 | * | 7/2002 | Hayabuchi et al. ...... 475/278 |
| 2004/0053734 A1 | * | 3/2004 | Raghavan et al. ....... 475/276 |

FOREIGN PATENT DOCUMENTS

| | | | |
|---|---|---|---|
| DE | 10247702 A1 | * | 4/2004 |
| JP | 402102952 A | * | 4/1990 |
| JP | 402102953 A | * | 4/1990 |
| JP | 402102954 A | * | 4/1990 |
| JP | 402154840 A | * | 6/1990 |
| JP | 402154841 A | * | 6/1990 |
| JP | 402154845 A | * | 6/1990 |
| WO | WO03/095865 | | 11/2003 |

* cited by examiner

Primary Examiner—Tisha Lewis
(74) Attorney, Agent, or Firm—Christopher DeVries

(57) ABSTRACT

A multi-speed transmission includes an input shaft, an output shaft, and a planetary gear arrangement having three planetary gear sets. The input shaft and output shaft are continuously connected with members of the planetary gear sets. Six torque-transmitting mechanisms selectively connect specific members of the planetary gear sets with other members of the planetary gear sets, or with the transmission housing. Fluid for applying two of the torque-transmitting mechanisms is carried through a shaft which is connected to a sun gear of the first planetary gear set. The six torque-transmitting mechanisms are engaged in combinations of three to establish seven forward speed ratios and a reverse speed ratio between the input shaft and the output shaft.

7 Claims, 5 Drawing Sheets

FIG. 2a — GEARSETS (TOOTH COUNTS OR RATIOS)

| | TYPE | S | Ps | Pr | R |
|---|---|---|---|---|---|
| GS1 | COMPND | 1 | 0.68 | 0.68 | 2.6 |
| GS2 | SIMPLE | 1 | 0.675 | | 2.35 |
| GS3 | SIMPLE | 1 | 0.3 | | 1.6 |
| | | | | | |
| | | | | | |
| | | | | | |
| | | | | | |

FIG. 2b — FIXED CONNECTIONS

| | |
|---|---|
| R3 | INPUT |
| R1 | OUTPUT |
| R1 | R2 |
| PC1 | PC2 |
| | |
| | . |
| | |
| | |
| | |
| | |
| | |
| | |
| | |
| | |

FIG. 2c — LEVER PROPORTIONS

| | |
|---|---|
| a | 1.60 |
| b | 2.35 |
| c | 1.00 |
| d | 1.60 |
| e | 1.00 |
| f | |

| R/S RATIOS | R1/S1 | R2/S2 | R3/S3 | | | |
|---|---|---|---|---|---|---|
| | 2.60 | 2.35 | 1.60 | | | |
| P/S RATIOS | P1s/S1 | P1r/S1 | P2/S2 | P3/S3 | | |
| | 0.68 | 0.68 | 0.68 | 0.30 | | |

| GEAR STATE | GEAR RATIO | RATIO STEPS | CBR1 (50) CLUTCH | CB27 (52) CLUTCH | C356R (54) CLUTCH | C4567 (56) CLUTCH | CBR123467 (58) CLUTCH | C12345 (59) CLUTCH |
|---|---|---|---|---|---|---|---|---|
| | | | PC1 | S2 | S2 | INPUT | S3 | S1 |
| | | | GROUND | GROUND | PC3 | PC1 | GROUND | PC3 |
| Rev | -3.819 | | X | | G | | X | |
| N | | -0.90 | O | | | | O | |
| 1st | 4.225 | 1.76 | X | X | | | X | G |
| 2nd | 2.401 | 1.48 | | X | | | X | X |
| 3rd | 1.625 | 1.38 | | | X | | X | X |
| 4th | 1.174 | 1.17 | | | X | X | X | X |
| 5th | 1.000 | 1.16 | | | X | X | X | X |
| 6th | 0.859 | 1.23 | | X | X | X | | X |
| 7th | 0.701 | | | | | X | X | |
| 8th | | | | | | | | |

FIG. 2e

SEVEN-SPEED TRANSMISSION

CROSS-REFERENCE TO RELATED APPLICATION

This application claims the benefit of U.S. Provisional Application 60/497,640, filed Aug. 25, 2003, which is hereby incorporated by reference in its entirety.

TECHNICAL FIELD

The present invention relates to a transmission having three planetary gear sets that are controlled by six torque-transmitting mechanisms to provide seven forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft) transmissions were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. No. 4,709,594 to Maeda; U.S. Pat. No. 6,053,839 to Baldwin et. al.; and U.S. Pat. No. 6,083,135 to Baldwin et. al. Seven-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

The invention provides a seven-speed transmission having three planetary gear sets controlled by six torque-transmitting mechanisms to provide seven forward speed ratios and a reverse speed ratio. Oil for activating two of the clutches is transferred through a sun gear shaft to minimize overall length of the transmission.

More specifically, the invention provides a seven-speed transmission including an input shaft, an output shaft and a planetary gear arrangement having first, second and third planetary gear sets. Each planetary gear set has first, second and third members. The input shaft is continuously connected with the first member of the first planetary gear set, and the output shaft is continuously connected with the first member of the third planetary gear set. A first torque-transmitting mechanism selectively interconnects the second member of the second planetary gear set with a transmission housing. A second torque-transmitting mechanism selectively interconnects the third member of the second planetary gear set with the transmission housing. A third torque-transmitting mechanism selectively interconnects the second member of the first planetary gear set with the third member of the second planetary gear set. A fourth torque-transmitting mechanism selectively interconnects the first member of the first planetary gear set with the second member of the third planetary gear set. A fifth torque-transmitting mechanism selectively connects the third member of first planetary gear set with the transmission housing. A sixth torque-transmitting mechanism selectively connects the second member of the first planetary gear set with the third member of the third planetary gear set.

Fluid for applying the third and sixth torque-transmitting mechanisms is carried through a shaft which is connected to a sun gear of the first planetary gear set.

The first, second, third, fourth, fifth and sixth torque-transmitting mechanisms are engaged in combinations of three to establish seven forward speed ratios and a reverse speed ratio between the input shaft and the output shaft.

Preferably, the sun gear of the first planetary gear set is the third member of the first planetary gear set.

The first member of the second planetary gear set and the first member of the third planetary gear set comprise a single elongated ring gear, or two interconnected ring gears.

The first and second planetary gear sets are simple planetary gear sets, and the third planetary gear set is a compound planetary gear set.

Preferably, each of the first members is a ring gear, each of the second members is a planet carrier assembly member, and each of the third members is a sun gear.

The above features and other features and advantages of the present invention are readily apparent from the following detailed description of the preferred embodiment when taken in connection with the accompanying drawings.

BRIEF DESCRIPTION OF THE DRAWINGS

FIGS. 2a, b, c, d and e show a ratio table, fixed connections table, lever proportions table, ring gear/sun gear ratios table, and truth table, respectively, corresponding with the transmission of FIG. 1;

FIG. 4b shows an enlarged partial view of the cross-section of FIG. 4a.

DESCRIPTION OF THE PREFERRED EMBODIMENT

Figures 1, 2D:
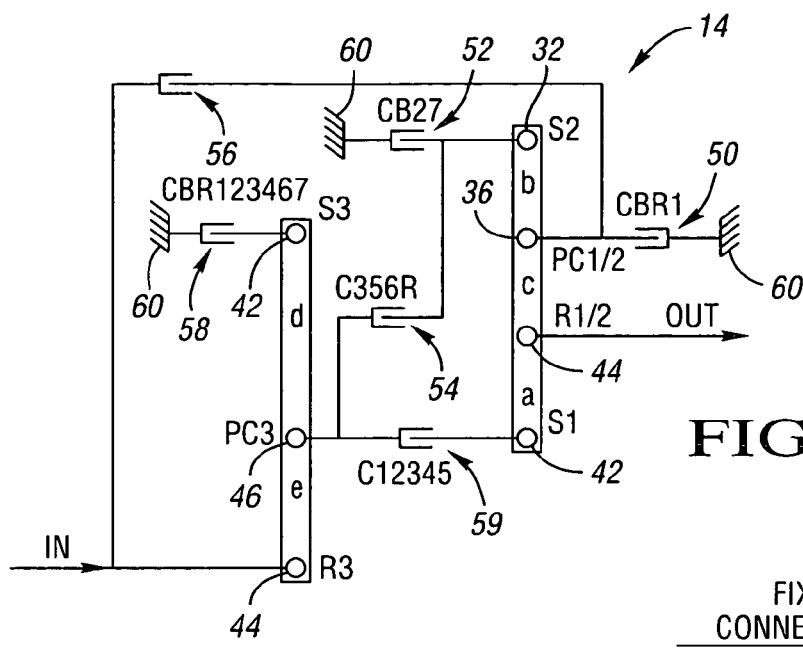
FIG. 1 shows a lever diagram of a transmission in accordance with the invention.
Figure 3:
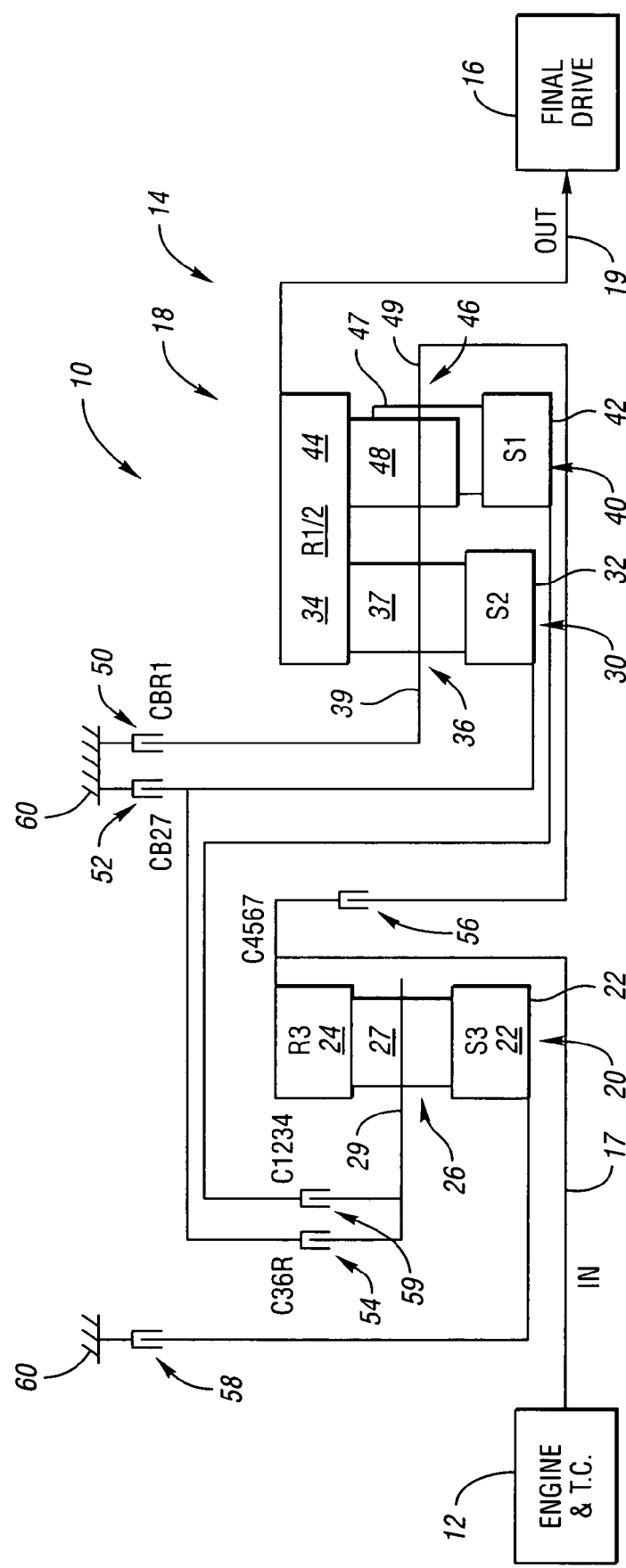
FIG. 3 shows a stick diagram corresponding with the lever diagram of FIG. 1.

Referring to FIGS. 1 and 3, a lever diagram and stick diagram are shown, respectively, for a transmission in accordance with the invention. Like reference numerals are used to refer to like components in all figures.

As shown in FIG. 3, a powertrain 10 includes a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40, viewed from left to right in FIG. 3.

The planetary gear set 20 includes a sun gear member 22, a ring gear member 24 and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34. The planetary gear set 30 is a simple planetary gear set.

Figure 4A:
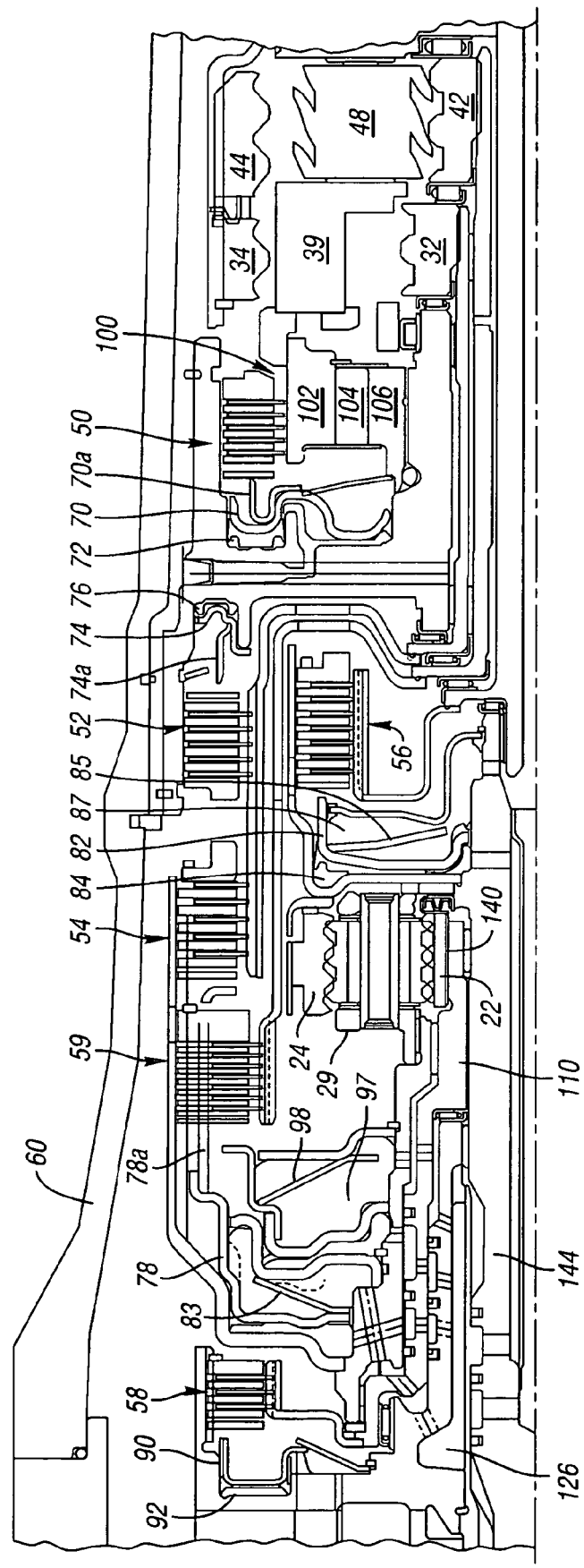
FIG. 4a shows a partial cross-sectional view of a transmission corresponding with the lever diagram and stick diagram of FIGS. 1 and 3.

The planetary gear set 40 includes a sun gear member 42, a ring gear member 44 and a planet carrier assembly member 46. The planet carrier assembly member 46 includes a plurality of pinion gears 47, 48 rotatably mounted on a carrier member 49 to form a compound planetary gear set. The pinion gears 47 are disposed in meshing relationship with the sun gear member 42, and the pinion gears 48 are disposed in meshing relationship with the ring gear member 44. The pinion gears 47, 48 also mesh with each other. The ring gear member 44 may be formed integrally with the ring gear member 34 such that a single elongated ring gear member forms both components. Alternatively, the ring gear member 34 and ring gear member 44 may be formed separately and connected together (as shown in FIGS. 4a and b). The planetary gear set 40 is a compound planetary gear set.

Alternatively, the planetary gear sets 30 and 40 may include a long pinion interconnecting the planet carrier assembly member 36 with the planet carrier assembly member 46, and the ring gear members 34, 44 may be separate ring gears.

The planetary gear arrangement 18 also includes six torque-transmitting mechanisms 50, 52, 54, 56, 58, 59. The torque-transmitting mechanisms 50, 52, 58 are stationary-type torque-transmitting mechanisms, commonly termed brakes or reaction clutches. The torque-transmitting mechanisms 54, 56, 59 are rotating-type torque-transmitting mechanisms, commonly termed clutches.

The input shaft 17 is continuously connected with the ring gear member 24, and the output shaft 19 is continuously connected with the ring gear member 44. A freewheeler may be optionally connected between the carrier 36 and the transmission housing 60.

As referred to in the claims, the planetary gear set 20 is the first planetary gear set, the planetary gear set 30 is the second planetary gear set, and the planetary gear set 40 is the third planetary gear set. Also referenced in the claims are first, second and third members of each planetary gear set. In the preferred embodiment, each first member is a ring gear member, each second member is a planet carrier assembly member, and each third member is a sun gear member. Also, the torque-transmitting mechanism 50 is referred to as the first torque-transmitting mechanism, the torque-transmitting mechanism 52 is the second torque-transmitting mechanism, the torque-transmitting mechanism 54 is the third torque-transmitting mechanism, the torque-transmitting mechanism 56 is the fourth torque-transmitting mechanism, the torque-transmitting mechanism 58 is the fifth torque-transmitting mechanism, and the torque-transmitting mechanism 59 is the sixth torque-transmitting mechanism.

The planet carrier assembly member 36 is selectively connectable with the transmission housing 60 through the brake 50. The sun gear member 32 is selectively connectable with the transmission housing 60 through the brake 52. The planet carrier assembly member 26 is selectively connectable with the sun gear member 32 through the clutch 54. The ring gear member 24 is selectively connectable with the planet carrier assembly member 46 through the clutch 56. The sun gear member 22 is selectively connectable with the transmission housing 60 through the clutch 58. The planet carrier assembly member 26 is selectively connectable with the sun gear member 42 through the clutch 59.

As shown in the truth table of FIG. 2e, the torque-transmitting mechanisms 50, 52, 54, 56, 58, 59 are selectively engaged in combinations of three to provide seven forward speed ratios and one reverse speed ratio. It should also be noted in the truth table that the torque-transmitting mechanisms 50, 58 remain engaged through the neutral condition, thereby simplifying the forward/reverse interchange.

To establish the reverse speed ratio, the torque-transmitting mechanisms 50, 54 and 58 are engaged. The overall numerical value of the reverse speed ratio is −3.819 as indicated in the truth table.

The first forward speed ratio is established with the engagement of the torque-transmitting mechanisms 50, 58, 59. The overall numerical value of the first forward speed ratio is 4.225, as indicated in the truth table.

The second forward speed ratio is established with the engagement of the torque-transmitting mechanisms 52, 58, 59. The overall numerical value of the second forward speed ratio is 2.401, as indicated in the truth table.

The third forward speed ratio is established with the engagement of the torque-transmitting mechanisms 54, 58, 59. The overall numerical value of the third forward speed ratio is 1.625, as indicated in the truth table.

The fourth forward speed ratio is established with the engagement of the torque-transmitting mechanisms 56, 58, 59. The overall numerical value of the fourth forward speed ratio is 1.174, as indicated in the truth table.

The fifth forward speed ratio is established with the engagement of the torque-transmitting mechanisms 54, 56, 59. The numerical value of the fifth forward speed ratio is 1, as indicated in the truth table.

The sixth forward speed ratio is established with the engagement of the torque-transmitting mechanisms 54, 56, 58. The numerical value of the sixth forward speed ratio is 0.859, as indicated in the truth table.

The seventh forward speed ratio is established with the engagement of the torque-transmitting mechanisms 52, 56, 58. The numerical value of the seventh forward speed ratio is 0.701, as indicated in the truth table.

As set forth above, the engagement schedules for the torque-transmitting mechanisms are shown in the truth table of FIG. 2e. This table also provides an example of speed ratios that are available using the ring gear/sun gear tooth ratios given by way of example in FIG. 2d. The R3/S3 value is the tooth ratio of the planetary gear set 20; the R2/S2 value is the tooth ratio of the planetary gear set 30; and the R1/S1 value is the tooth ratio of the planetary gear set 40. The truth table of FIG. 2e also describes the ratio steps that are attained utilizing the sample tooth ratios given. For example, the step ratio between the first and second forward ratios is 1.76, while the step ratio between the reverse and first forward ratio is –0.90. It can also be readily determined from the truth table of FIG. 2e that all of the single step forward ratio interchanges are of the single transition variety.

Figure 4B:
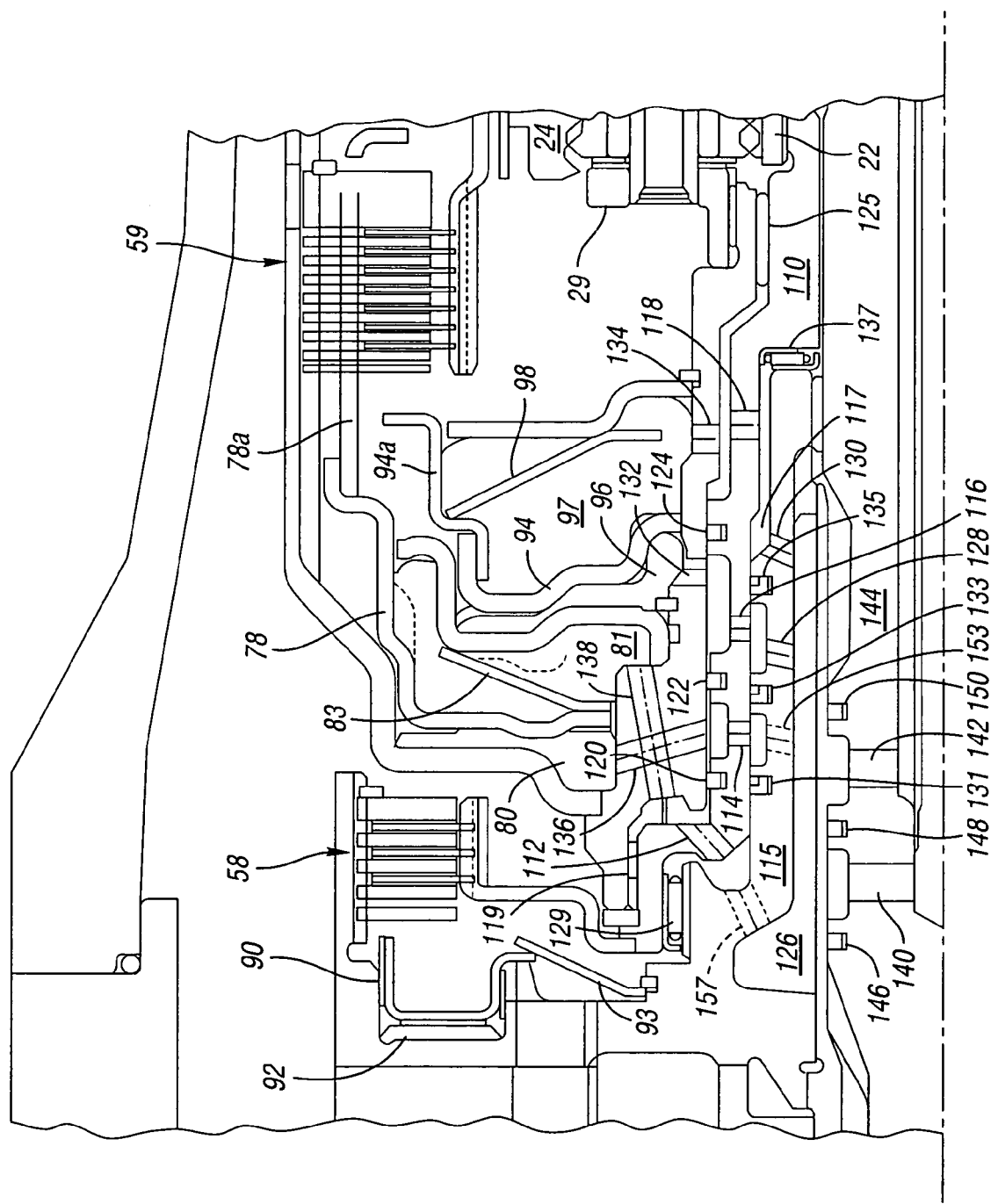

FIG. 4a shows a partial vertical cross-sectional view of a transmission embodying the connections of the lever diagram and stick diagram of FIGS. 1 and 3 described previously, and FIG. 4b shows an enlargement of FIG. 4a. Like reference numbers are used in FIGS. 4a and b to refer to like components from FIGS. 1–3. FIGS. 4a and b show the relationship between the various torque-transmitting mechanisms 50, 52, 54, 56, 58, 59, and the various planetary gear members which they engage.

As shown, the torque-transmitting mechanism 50 is applied by the piston 70, 70a by application of pressurized fluid in the apply chamber 72. The torque-transmitting mechanism 52 is applied by the piston 74, 74a by application of pressurized fluid in the apply chamber 76.

The torque-transmitting mechanism 54 is applied by the piston 78, 78a as a result of application of pressurized in the apply chamber 80. The application arm 78a of the piston 78 is castellated to pass through the plates of the clutch 59 for applying the clutch 54. A balance dam chamber 81 is provided with fluid to counterbalance centrifugal forces of fluid in the chamber 80. A return spring 83 biases the piston 78 toward the released position.

The torque-transmitting mechanism 56 is applied by the piston 82 when pressurized fluid is provided in the apply chamber 84. The piston 82 is biased by a spring 85 and a balance dam chamber 87 is also provided.

The torque-transmitting mechanism 58 is applied by the piston 90 when pressurized fluid is provided in the apply chamber 92. A return spring 93 is also provided.

The torque-transmitting mechanism 59 is applied by the piston 94, 94a when pressurized fluid is provided in the apply chamber 96. A balance dam chamber 97 and return spring 98 are also provided.

FIG. 4a also shows an optional freewheeler 100, including a race 102, a roller 104, and a cam 106. The freewheeler 100 is operative to selectively connect the carrier 39 with the transmission housing 60.

The sun gear 22 is supported on a rotatable hollow sun gear shaft 110, which has substantially radially-extending apertures 112, 114, 116, 118 which are positioned to provide fluid to the apply chamber 80, balance dam chamber 81, apply chamber 96, and balance dam chamber 97, respectively, as shown in FIGS. 4a and b. The apertures 112, 114, 116 and 118 intersect the hollowed portion 117 of the sun gear shaft 110. Seals 119, 120, 122, 124, 125 are provided adjacent channels 112, 114, 116, 118, 132, 134, 136, 138 to prevent leakage therethrough. Seals 131, 133, 135, and radial bearing 137 are operative to prevent leakage of the fluid which is fed into the channels 114, 116, 118. The bearing 129 is also used as a seal. The chamber 126 (and a plurality of similar, circumferentially speced chambers) feeds oil through the channels 128, 130 into the channels 116, 118, respectively (and the circumferentially spaced chambers feed channels 112, 114 via other channels 151, 153, shown in phantom, in the component 115). From the channel 116, the fluid enters the apply chamber 96 through the channel 132. From the channel 118, the fluid enters the balance dam chamber 97 through the channel 134. From the channel 114, the fluid enters the apply chamber 80 through the channel 136. From the channel 112, the fluid enters the balance chamber 81 through the channel 138.

The chamber 126 (and other circumferentially spaced chambers) also feed the apply chamber 84 and balance dam chamber 87 of the clutch 56 through channels 140, 142 in the turbine shaft 144. The channels 140, 142 are sealed by the seals 146, 148, 150.

In this manner, fluid for applying the third and sixth torque-transmitting mechanisms 54, 59 is fed through the sun gear shaft 110, which is splined to the sun gear 22 at the splines 140.

This configuration also provides the opportunity to friction launch using torque-transmitting mechanisms 50 or 58. This is done by slipping the torque-transmitting mechanisms 50 or 58 during launch. U.S. Pat. No. 6,471,616 describes another friction launching arrangement, which is hereby incorporated by reference in its entirety.

While the best mode for carrying out the invention has been described in detail, those familiar with the art to which this invention relates will recognize various alternative designs and embodiments for practicing the invention within the scope of the appended claims.

What is claimed is:

1. A multi-speed transmission comprising:
   an input shaft;
   an output shaft;
   a planetary gear arrangement having first, second and third planetary gear sets, each planetary gear set having first, second and third members;
   said input shaft being continuously interconnected with said first member of said first planetary gear set, and said output shaft being continuously interconnected with said first member of said third planetary gear set;
   a first torque-transmitting mechanism selectively interconnecting said second member of said second planetary gear set with a transmission housing;
   a second torque-transmitting mechanism selectively interconnecting said third member of said second planetary gear set with said transmission housing;

a third torque-transmitting mechanism selectively interconnecting said second member of said first planetary gear set with said third member of said second planetary gear set;

a fourth torque-transmitting mechanism selectively interconnecting said first member of said first planetary gear set with said second member of said third planetary gear set;

a fifth torque-transmitting mechanism selectively interconnecting said third member of said first planetary gear set with said transmission housing;

a sixth torque-transmitting mechanism selectively interconnecting said second member of said first planetary gear set with said third member of said third planetary gear set;

wherein fluid for applying said third and sixth torque-transmitting mechanisms is carried through a shaft which is connected to a sun gear of said first planetary gear set; and wherein said first member of said second planetary gear set and said first member of said third planetary gear set comprise a single elongated ring gear;

said first, second, third, fourth, fifth and sixth torque-transmitting mechanisms being engaged in combinations of three to establish seven forward speed ratios and a reverse speed ratio between said input shaft and said output shaft.

2. The transmission of claim 1, wherein said second planetary gear set is a simple planetary gear set, and said third planetary gear set is a compound planetary gear set.

3. The transmission of claim 1, wherein each of said first members is a ring gear, each of said second members is a planet carrier assembly member, and each of said third members is a sun gear.

4. The transmission of claim 1, wherein said first member of said second planetary gear set is integral with said first member of said third planetary gear set.

5. The transmission of claim 1, wherein said shaft which is connected to the sun gear of the first planetary gear set is hollow and includes substantially radially-extending apertures to carry the fluid to said third and sixth torque-transmitting mechanisms.

6. A multi-speed transmission comprising:
an input shaft;
an output shaft;
a planetary gear arrangement having first, second and third planetary gear sets, each planetary gear set having first, second and third members;
said input shaft being continuously interconnected with said first member of said first planetary gear set, and said output shaft being continuously interconnected with said first member of said third planetary gear set;

said first member of said second planetary gear set being integral with said first member of said third planetary gear set;

a first torque-transmitting mechanism selectively interconnecting said second member of said second planetary gear set with a transmission housing;

a second torque-transmitting mechanism selectively interconnecting said third member of said second planetary gear set with said transmission housing;

a third torque-transmitting mechanism selectively interconnecting said second member of said first planetary gear set with said third member of said second planetary gear set;

a fourth torque-transmitting mechanism selectively interconnecting said first member of said first planetary gear set with said second member of said third planetary gear set;

a fifth torque-transmitting mechanism selectively interconnecting said third member of said first planetary gear set with said transmission housing;

a sixth torque-transmitting mechanism selectively interconnecting said second member of said first planetary gear set with said third member of said third planetary gear set;

wherein fluid for applying said third and sixth torque-transmitting mechanisms is carried through a shaft which is connected to a sun gear of said first planetary gear set;

wherein each of said first members is a ring gear, each of said second members is a planet carrier assembly member, and each of said third members is a sun gear;

wherein said first member of said second planetary gear set and said first member of said third planetary gear set comprise a single elongated ring gear;

wherein said second planetary gear set is a simple planetary gear set, and said third planetary gear set is a compound planetary gear set; and said first, second, third, fourth, fifth and sixth torque-transmitting mechanisms being engaged in combinations of three to establish seven forward speed ratios and a reverse speed ratio between said input shaft and said output shaft.

7. The transmission of claim 6, wherein said shaft which is connected to the sun gear of the first planetary gear set is hollow and includes substantially radially-extending apertures to carry the fluid to said third and sixth torque-transmitting mechanisms.

* * * * *